UNITED STATES PATENT OFFICE.

WILLIAM A. BALDWIN, OF HAIKU, MAUI, TERRITORY OF HAWAII.

PROCESS OF TREATING PINEAPPLES FOR CANNING.

1,039,350. Specification of Letters Patent. Patented Sept. 24, 1912.

No Drawing. Application filed May 13, 1912. Serial No. 696,809.

*To all whom it may concern:*

Be it known that I, WILLIAM A. BALDWIN, citizen of the United States, residing at Haiku, Maui, Territory of Hawaii, have invented new and useful Improvements in Processes of Treating Pineapples for Canning, of which the following is a specification.

This invention relates to a process for treating pineapples preparatory to canning, and pertains especially to the treatment of that variety of pineapples known as the smooth cayenne pineapples. This variety of pineapples varies greatly in flavor; in acid; in sugar content and in color of pulp. The fruit which shows the lightest colored pulp is higher in acid content and inferior in flavor. It is therefore less desirable as compared with fruit that shows a deeper colored pulp, and for the canning industry it is very desirable to effect a uniform color and flavor in the canned fruit. With this object in view, experts have been working and experimenting for years, both in the field and the cannery, and the process described below, when used on the light colored fruit so improves the flavor and the color of the fruit as to make it compare favorably with the best fruit which has the deeper colored pulp and a lower acid content.

The object of the present invention is to provide a process or method for deepening the color, removing and diluting acidity content, and improving the flavor of smooth cayenne pineapples preparatory to canning same in hermetically sealed packages.

In carrying out the process, the rind of the pineapple is removed, after which the fruit is immersed in pineapple juice, either diluted or undiluted, preferably clarified, and subjected to a steam bath at approximately a temperature of 200° F., for a short period, preferably not longer than 4 or 5 minutes, or sufficient to remove the undesired acidity content of the pineapple. Then the liquor resulting from this first cook is drained off, taking with it this undesirable acidity content of the original raw fruit. The second step in the process is the covering of the hot fruit with fresh syrup consisting either of sugar and water or a clarified pineapple syrup; the whole being then subjected to a steam bath at a temperature of approximately 200° F., for a period of approximately 3 or 4 minutes, or sufficient to deepen the color to the desired point and yet not destroy the natural pineapple flavor. It is during this second cook that the desired results of changing or deepening the color and improving the flavor are obtained. If it were not for the first step as above, the desired change of color in the second step would not result.

Having thus described my invention, what I claim and desire to secure by Letters Patent is—

The process of preparing the acid-containing, light colored pineapple for canning purposes, which comprises the cooking of the peeled fruit in pineapple juice sufficient to remove the undesired acidity content of the pineapple; then withdrawing the liquor from the fruit; covering the fruit with fresh syrup, and subjecting this to a second cook for a time sufficient to deepen the color desirably, and insufficient to destroy the natural pineapple flavor.

In testimony whereof I have hereunto set my hand in the presence of two subscribing witnesses.

WILLIAM A. BALDWIN.

Witnesses:
R. T. ROLPH,
M. V. COLLINS.

Copies of this patent may be obtained for five cents each, by addressing the "Commissioner of Patents, Washington, D. C."